(12) United States Patent
O'Neal et al.

(10) Patent No.: US 6,297,946 B2
(45) Date of Patent: Oct. 2, 2001

(54) PORTABLE COMPUTER HAVING A SEALED HINGE CLUTCH

(75) Inventors: Sean P. O'Neal, Round Rock; Reynold Liao, Austin, both of TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/825,222

(22) Filed: Apr. 3, 2001

Related U.S. Application Data

(62) Division of application No. 09/385,182, filed on Aug. 30, 1999.

(51) Int. Cl.⁷ .............. E05D 11/08; E05C 17/64; H05K 5/00; G02F 1/1333
(52) U.S. Cl. .............. 361/681; 361/682; 361/683; 364/708.1; 16/340; 16/334; 248/917
(58) Field of Search .............. 361/683, 682, 361/681; 364/708.1; 345/905; 248/184.1, 917, 923; 40/530; 16/327, 325, 341, 342, 334, 335, 340; 403/119, 120, 121, 146

(56) References Cited

U.S. PATENT DOCUMENTS

| | | | |
|---|---|---|---|
| 4,155,144 | * 5/1979 | Koganei | 16/54 |
| 4,325,164 | * 4/1982 | Sasaki | 16/55 |
| 4,485,522 | * 12/1984 | Chen | 16/54 |
| 4,730,364 | 3/1988 | Tat-Kee . | |
| 4,772,150 | 9/1988 | Horton . | |
| 5,001,659 | 3/1991 | Watabe . | |
| 5,079,799 | * 1/1992 | Rude et al. | 16/342 |
| 5,088,156 | * 2/1992 | Hosoi | 16/342 |
| 5,142,738 | * 9/1992 | Ojima | 16/306 |
| 5,173,837 | * 12/1992 | Blackwell et al. | 361/380 |
| 5,195,213 | * 3/1993 | Ohgami et al. | 16/342 |
| 5,419,013 | * 5/1995 | Hsiao | 16/319 |
| 5,542,505 | * 8/1996 | Kempf | 188/77 W |
| 5,566,048 | 10/1996 | Esterberg et al. . | |
| 5,566,423 | * 10/1996 | Hassler et al. | 16/319 |
| 5,664,286 | * 9/1997 | Sorimachi | 16/54 |
| 5,796,576 | 8/1998 | Kim . | |
| 5,796,581 | 8/1998 | Mok . | |
| 5,832,566 | * 11/1998 | Quek et al. | 16/342 |
| 5,894,635 | * 4/1999 | Lu | 16/342 |
| 5,920,959 | * 7/1999 | DeMarco | 16/257 |
| 5,970,580 | * 10/1999 | Katoh | 16/337 |
| 5,996,132 | * 12/1999 | Sorimachi | 4/236 |
| 6,052,869 | * 4/2000 | Suzuki | 16/341 |
| 6,108,868 | * 8/2000 | Lin | 16/340 |
| 6,125,509 | * 10/2000 | Hartigan et al. | 16/337 |

FOREIGN PATENT DOCUMENTS

| | | | | |
|---|---|---|---|---|
| 2166796 | * | 5/1986 | (GB) | E05D/11/08 |
| 2290345 | * | 12/1995 | (GB) | E05D/11/08 |
| 2305690 | * | 4/1997 | (GB) | E05D/11/08 |
| 9-42271 | * | 2/1997 | (JP) | F16C/11/10 |
| 10-273987 | * | 10/1998 | (JP) | E05D/11/08 |

\* cited by examiner

*Primary Examiner*—Leo P. Picard
*Assistant Examiner*—Anatoly Vortman
(74) *Attorney, Agent, or Firm*—Haynes and Boone, L.L.P.

(57) ABSTRACT

A portable computer including two plastic enclosures has a first hinge body attached to a first one of the enclosures. The first hinge body includes a bore formed therein. A flowable lubricant such as grease is disposed within the bore. A second hinge body is attached to a second one of the enclosures. The second hinge body includes an elongated shaft pivotally mounted within the bore having grooves formed on an outer surface of the shaft. A sealing member such as an O-ring is resiliently compressed between one of the grooves and an inner surface of the bore. A friction member is seated in another one of the grooves and in contact with the inner surface of the bore. The seal member has a coefficient of friction such that friction between the seal member and the bore is negligible with respect to friction between the friction member and the bore. The seal member limits the escape of lubricant and the resulting lubricant-induced stress cracks.

10 Claims, 2 Drawing Sheets

PORTABLE COMPUTER HAVING A SEALED HINGE CLUTCH

This application is a divisional of U.S. Ser. No. 09/385,182, filed Aug. 30, 1999.

BACKGROUND

The disclosures herein relate generally to computer systems and more particularly to portable computers having a sealed hinge clutch.

Portable computers typically include top and base enclosures formed of synthetic, i.e. plastic material. The top and base of most portable computers are attached using a metal hinge clutch to control the torque required to open and close the top. Most portable computers utilize a hinge clutch having either a friction plate design or a friction shaft design. The friction shaft design is often used to minimize the front-to-back dimension of the portable computer. For this type of design, lubrication is necessary to maintain a uniform and consistent pivoting action and clutch torque.

Various hinge devices have been used in computer housings. U.S. Pat. No. 5,566,048 discloses a hinge assembly that allows a display housing to pivot relative to a portable computer base. The hinge assembly has a pivot shaft attached to the display housing and a spring. The spring has two ends. One end is attached to the display housing, and the other end is attached to the base. The spring counteracts the torque created by the weight of the display housing. This allows a smaller and lighter friction mechanism to be used to allow the display housing to remain in an open position at an angular orientation selected by the user.

U.S. Pat. No. 5,142,738 discloses a hinge device used between a rotatable component and a stationary component to work as a pivoting device. The device provides a restrained rotation of one component in relation to the other. The rotational restraint is provided by a high viscosity grease and the torsional force of a coil spring inserted therein in a predetermined angular range to restrain the rotating speed by means of the high viscosity grease and the coil spring.

U.S. Pat. No. 5,001,659 discloses a structure for connecting a cover of a portable laptop personal computer, word processor or similar equipment having a display rotatably connected to a case which accommodates a body of the computer or word processor. The case and cover are electrically interconnected at co-active hinge portions thereof by a pair of deformed O-rings and a pair of flat O-rings.

U.S. Pat. No. 4,730,364 discloses a hinge such as may be used for pivotally attaching a liquid crystal display panel to a portable computer base. The panel is held open in selected angular positions by means of a frictional fit between an O-ring and the end of a bearing which is rotatably retained within a follower, to compress the O-ring between it and the follower such that the frictional resistance between the bearing and the follower may be adjusted to control the holding force on the panel.

Prior hinge clutches do not incorporate a reliable sealing mechanism to contain lubricant within the hinge clutch assembly. As a result, over time, the lubricant has a tendency to migrate from the metal hinge clutch to the plastic housing. Most of the commonly used lubricants deteriorate engineering grade plastics commonly used in computer housings, making them more susceptible to stress cracks.

The loss of lubrication also causes the hinge torque to increase significantly. As the torque required to open and close the computer enclosure increases, the torque loading applied to the adjacent portions of the enclosure also increases. The repeated opening and closing of top of the computer often result in the formation of stress cracks in deteriorated portions of the plastic enclosure.

Accordingly, there is a need for a lubricated hinge clutch that overcomes the shortcomings of prior hinge clutch assemblies so as to avoid contaminating the plastic housing.

SUMMARY

One embodiment, accordingly, provides a hinge clutch having a seal for containing lubricant therein. To this end, one embodiment provides a hinge assembly including a first hinge body having a bore formed therein and a second hinge body including an elongated shaft pivotally mounted within the bore. The shaft has a plurality of grooves formed therein. At least one of the grooves includes a friction member mounted therein and another of the grooves includes a seal member mounted therein. The seal member and friction member are in friction contact with the bore. The seal member has a coefficient of friction such that friction between the seal member and the bore is negligible with respect to friction between the friction member and the bore.

A principal advantage is that the lubricant is sealed and limited to the metal hinge so that portions of the plastic enclosure adjacent to the hinge clutch assembly are not exposed to significant amounts of lubricant, thus reducing the potential for degradation of the plastic enclosure and the formation of stress cracks.

BRIEF DESCRIPTION OF THE DRAWING FIGS.

DETAILED DESCRIPTION

Figure 1:
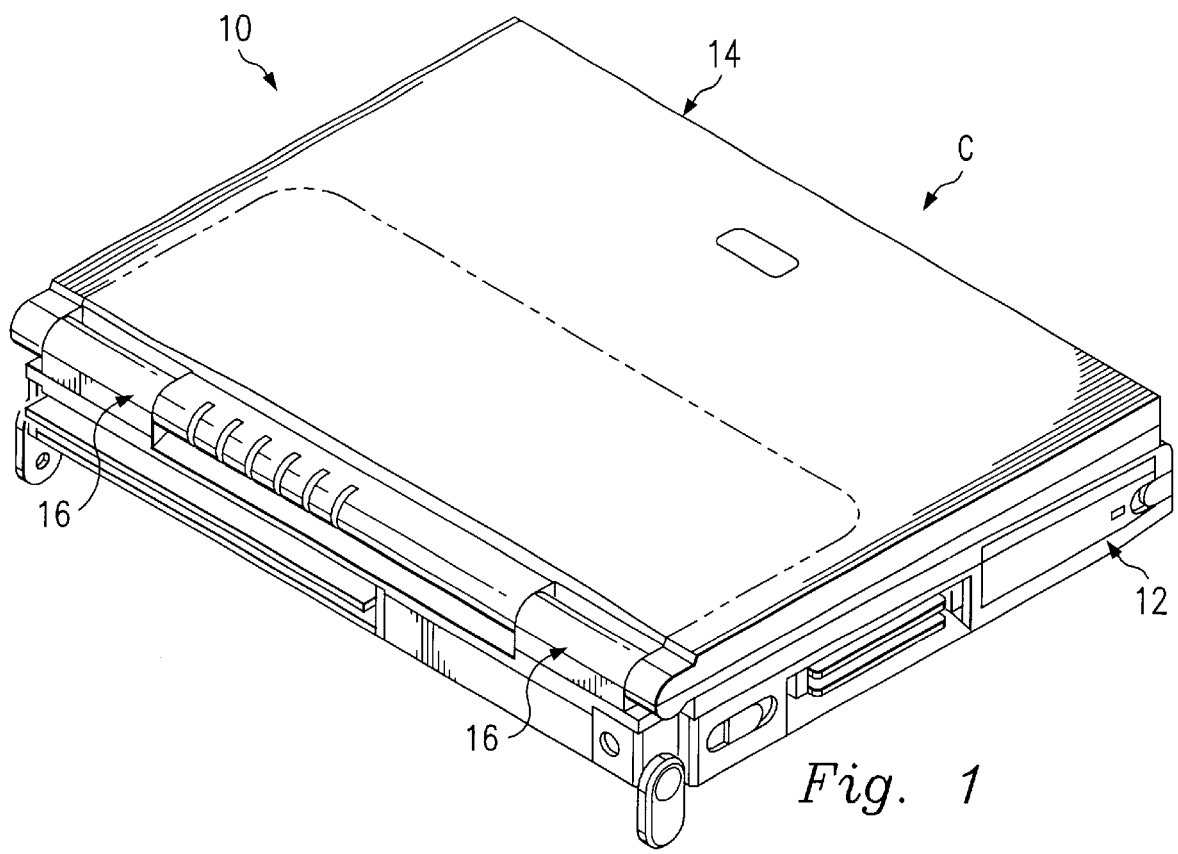
FIG. 1 is a perspective view illustrating an embodiment of a portable computer with the top in a closed position.
Figure 2:
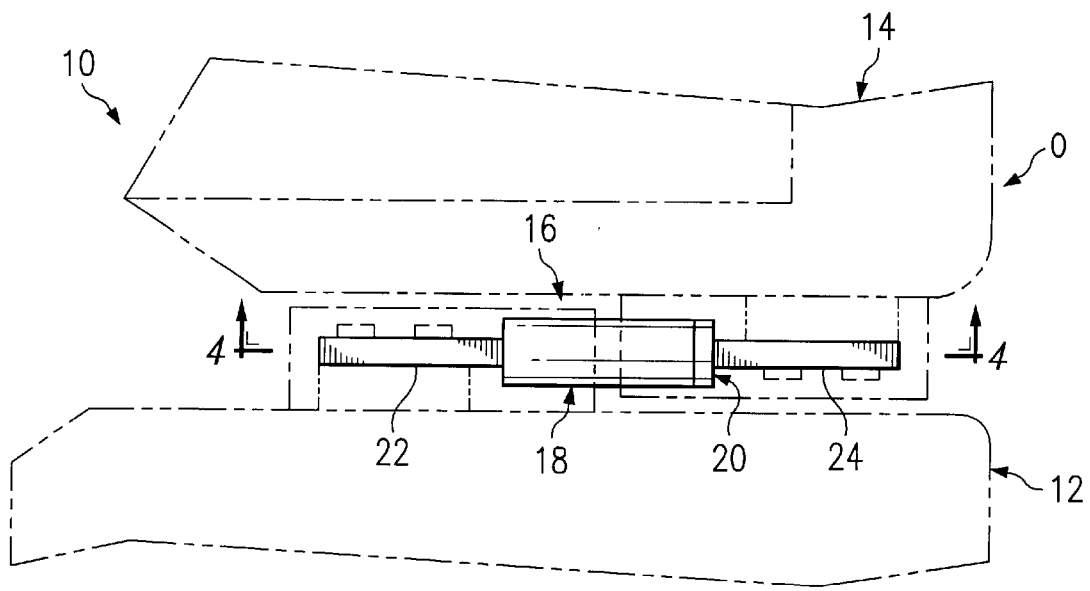
FIG. 2 is a fragmented front view illustrating an embodiment of a portable computer with the top in an open position.

An embodiment of a portable computer 10 is illustrated in FIGS. 1 and 2. The portable computer 10 includes a base 12 and a top 14. The base 12 and the top 14 are pivotally attached by one or more hinge clutch assemblies 16, FIGS. 1 and 2. The top 14 is movable between a closed position C, FIG. 1, and an open position O, FIG. 2. The base 12 and top 14 may be made from an engineering grade plastic such as polycarbonate, acrylonitrile butadiene styrene (commonly known as ABS) or a combination thereof using a process such as injection molding.

The hinge clutch assembly 16 provides a resistive torque as the top 14 of the portable computer 10 is being moved between the open position O and the closed position C. The resistive torque provides the operator of the portable computer 10 with resistive yet smooth feedback while positioning the top 14 in a desired open position. The hinge clutch assembly 16 also provides suitable static friction to maintain the top 14 in the desired open position.

Figure 3:
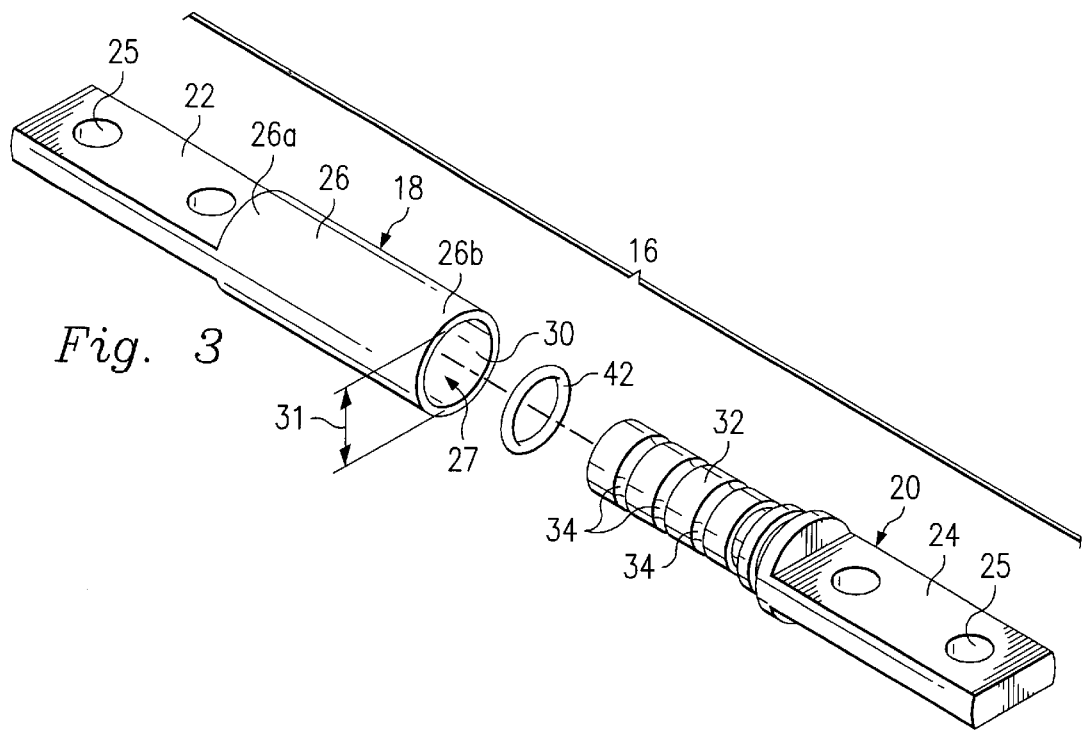
FIG. 3 is an exploded view illustrating an embodiment of a hinge clutch.
Figure 4:
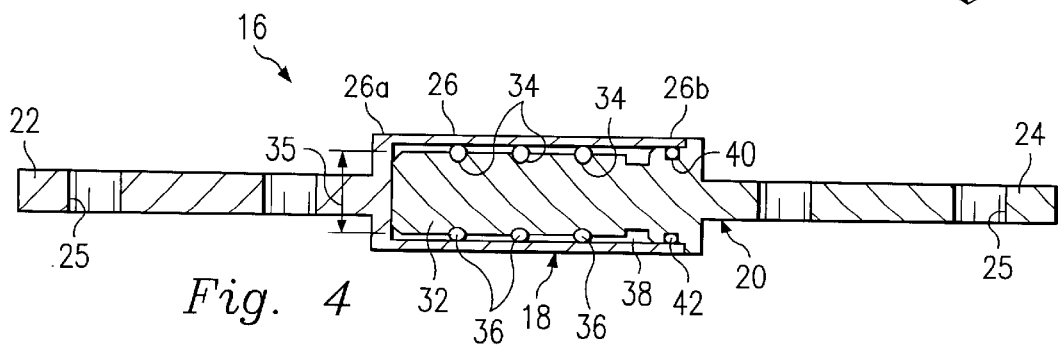
FIG. 4 is a cross sectional view taken along line 4—4 in FIG. 2.

Referring now to FIGS. 3 and 4, the hinge clutch assembly 16 includes a first hinge body 18 and a second hinge body 20. The first hinge body 18 includes a mounting flange 22 for attachment to the base 12 of the portable computer 10. The second hinge body 20 includes a mounting flange 24 for attachment to the top 14 of the portable computer 10. The orientation of the hinge clutch assembly 16 may be reversed whereby the first hinge body 18 is attached to the top 14 and the second hinge body 20 is attached to the base 12. The mounting flanges 22, 24 each include one or more holes 25 for facilitating attachment of the respective hinge body 18, 20 to the base 12 or top 14 of the portable computer 10.

Still referring to FIGS. 3 and 4, the first hinge body 18 includes a tube portion 26 having a closed end 26a adjacent to the mounting flange 22 and an open end 26b opposite the mounting flange 22. The tube portion 26 has a generally cylindrical interior surface 30, FIG. 3, defining a bore 27 having a diameter 31. The second hinge body 20 includes a shaft 32 attached to the mounting flange 24. The shaft 32 has a diameter 35, FIG. 4, and includes a plurality of grooves 34. A friction band 36, FIG. 4, is received in each groove 34. The friction bands 36 are ring-shaped pieces of wire such as a low carbon steel.

The difference between the diameter 31 and the diameter 35 defines a friction band gap. The friction bands 36 are sized to have a diameter that is approximately the same or slightly larger than the friction band gap. The friction bands are compressed between the tube portion 26 of the first hinge body 18 and the shaft 32 of the second hinge body 20. The compression of the friction bands 36 results in friction when the hinge bodies are pivoted with respect to each other. The friction provides the resistive torque applied by the hinge clutch assembly 16 during movement of the top 14 between the open position O and closed position C.

It is desirable for the resistive torque to be maintained at a relatively constant level over the life of the hinge clutch assembly 16. Accordingly, a lubricant 38, FIG. 4, such as a flowable grease composition is disposed between the tube portion 26 of the first hinge body 18 and the shaft 32 of the second hinge body 20. A suitable lubricant has been found to be a product sold by the Dow Company under the tradename Molycote. A key aspect of this invention is to minimize the migration of the lubricant 38 from within the hinge clutch assembly 16. Accordingly, a seal is formed between the tube portion 26 of the first hinge body 18 and the shaft 32 of the second hinge body 20. One embodiment for providing a seal includes forming a groove 40, FIG. 4, on an outer surface in the shaft 32 adjacent to the flange 24 and compressing a resilient sealing member 42 between the groove 40 and the interior surface 30 of the tube portion 26. A suitable resilient sealing member 42 has been found to be a commercially available O-ring formed of a material such as silicone rubber using a process such as injection molding. It is preferred that the O-ring be made of a material having a low coefficient of friction such that the friction associated with the O-ring is negligible with respect to that associated with the friction-rings 36.

Figure 5:
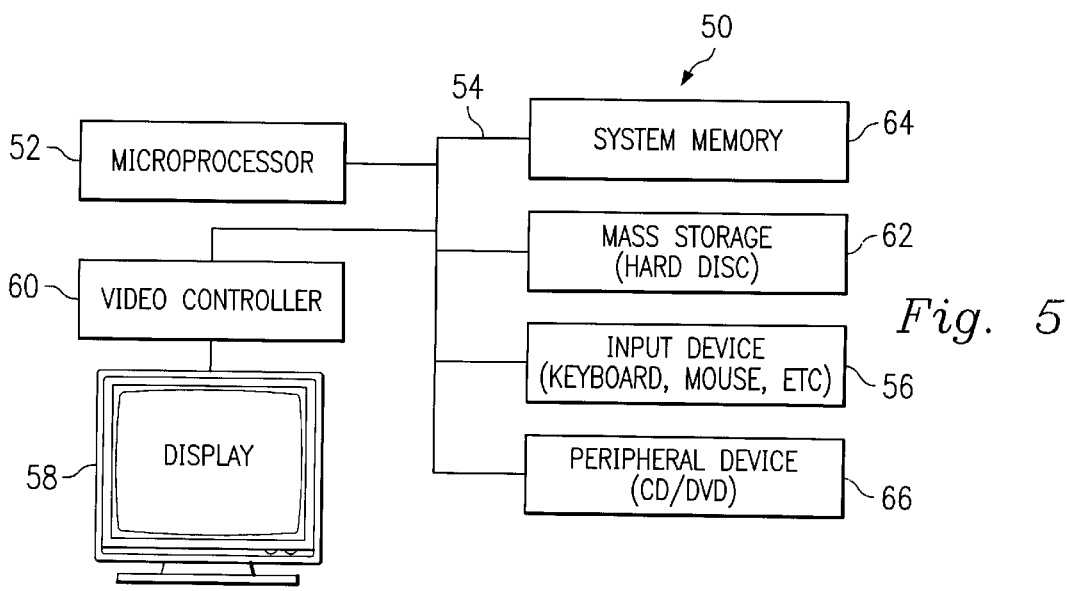
FIG. 5 is a block diagram illustrating an embodiment of a computer system.

An embodiment of a computer system 50 is illustrated in FIG. 5. The computer system 50 includes at least one microprocessor 52. The microprocessor 52 is connected to a bus 54. The bus 54 serves as a connection between the microprocessor 52 and other components of the computer system 50. One or more input devices 56 may be coupled to the microprocessor 52 to provide input to the microprocessor 52. Examples of input devices include keyboards, touchscreens, and pointing devices such as a mouse, a trackball and a trackpad. The computer system 50 may also include a display 58 which is coupled to the microprocessor 52 typically by a video controller 60. Programs and data are stored on a mass storage device 62 which is coupled to the microprocessor 52. Mass storage devices include components such as hard disks, optical disks, magneto-optical drives, floppy drives, and the like. A system memory 64 provides the microprocessor 52 with fast storage to facilitate execution of computer programs by the microprocessor 52. A peripheral device 66 may be connected to the microprocessor 52 for providing the computer system 50 with additional functionality. Examples of peripheral devices include floppy disk drives, hard disk drives, compact disc players, digital video disc players, memory card readers, and other types of devices. The various components of the computer system are typically mounted in a chassis or in an enclosure of a desktop or portable computer 10. It should be understood that other busses and intermediate circuits can be employed between the components described above and microprocessor 52 to facilitate interconnection between the components and the microprocessor 52.

As it can be seen, the embodiments presented herein provide several advantages. Only a negligible amount, if any, of the lubricant can escape from the hinge clutch. The potential for lubricant-induced stress cracks in a plastic enclosure is reduced. The modifications to the hinge clutch for implementing a seal do not necessitate modifications to the enclosure or other portions of the computer. Furthermore, these modifications do not add significantly to the cost of the hinge clutch. The addition of the sealing member does not adversely affect the torque specifications of the hinge clutch. The torque specification is maintained over a longer period of time as a result of the volume of lubricant in the hinge clutch remaining at a relatively constant level.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A hinge assembly, comprising:

a first hinge body including a bore formed therein;

a second hinge body including an elongated shaft pivotally mounted within the bore; and the shaft having a plurality of grooves formed therein, at least one of the grooves having a friction member mounted therein, and another of the grooves having a resilient seal member mounted therein, the seal member and the friction member being in friction contact with the bore, and the seal member having a coefficient of friction such that friction between the seal member and the bore is negligible with respect to friction between the friction member and the bore.

2. The hinge assembly of claim 1 further comprising a lubricant disposed within the bore of the first hinge body.

3. The hinge assembly of claim 2 wherein the lubricant is grease.

4. The hinge assembly of claim 2 wherein the lubricant is a flowable material.

5. The hinge assembly of claim 1 wherein the seal member is an O-ring.

6. The hinge assembly of claim 1 wherein the grooves are formed on an outer surface of the shaft.

7. The hinge assembly of claim 1 wherein the first hinge body includes a tube portion having a closed end and an open end, the bore extending along a longitudinal axis of the tube portion and wherein the seal member is positioned adjacent to the open end of the bore.

8. The hinge assembly of claim 7 wherein the friction member is positioned between the seal member and the closed end of the tube portion.

9. The hinge assembly of claim 8 wherein the friction member is formed of a low carbon steel.

10. A portable computer hinge assembly, comprising:

a base;

a top pivotally connected to the base by at least one hinge;

a generally cylindrical tube portion of the hinge, the tube portion having an open end, a closed end, and an inner surface;

a shaft of the hinge having a first end, a second end and an outer surface, the shaft being pivotally mounted within the tube, the first end of the shaft being positioned adjacent to the closed end of the tube and the second end of the shaft being positioned adjacent to the open end of the tube;

a plurality of grooves formed on an outer surface of the shaft, at least one of the grooves having a friction member mounted therein, and another of the grooves having a resilient seal member mounted therein; and the resilient seal member and the friction member being in friction contact with the tube, and the seal member having a coefficient of friction such that friction between the seal member and the tube is negligible with respect to friction between the friction member and the tube.

* * * * *